Oct. 23, 1956    R. D. BOND ET AL    2,767,887
SPREADER FOR LAWNS AND SMALL GARDENS
Filed Oct. 15, 1953
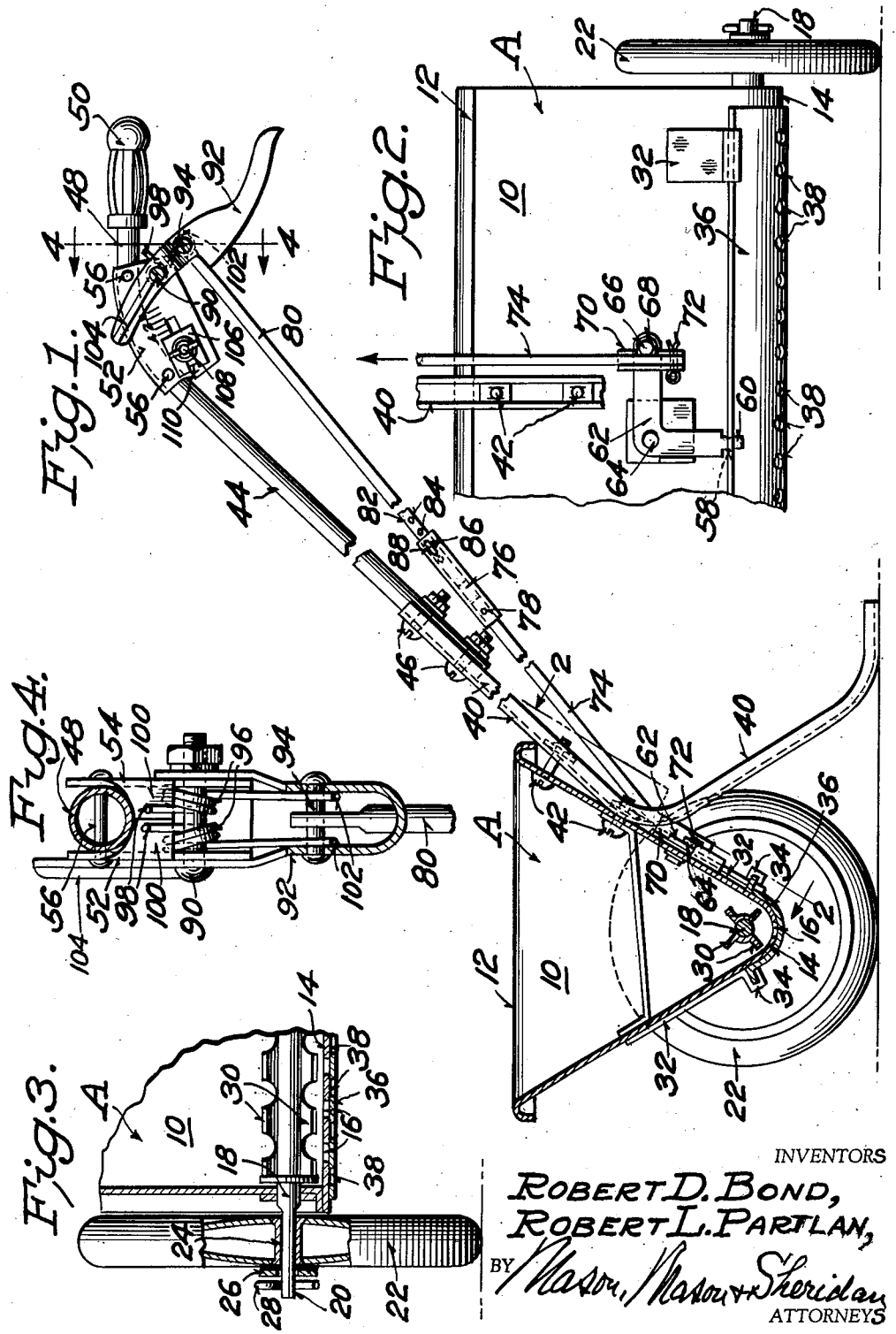
INVENTORS
ROBERT D. BOND,
ROBERT L. PARTLAN,
BY Mason, Mason & Sheridan
ATTORNEYS United States Patent Office 2,767,887
Patented Oct. 23, 1956

2,767,887

SPREADER FOR LAWNS AND SMALL GARDENS

Robert D. Bond, Detroit, and Robert L. Partlan, Birmingham, Mich., assignors to Douglas Machine Products Co., Wyandotte, Mich., a corporation of Michigan Application October 15, 1953, Serial No. 386,338

12 Claims. (Cl. 222—177)

This invention relates to a manually operated spreader for depositing seed, fertilizer, and other material on a lawn or on a small garden.

An object of the invention is to provide in a structure of the type set forth, a hand operated means for controlling the feeding of the material from the spreader onto the surface to be treated.

Another object is to provide means for automatically shutting off the feed of the material from the spreader to the lawn or garden.

A further object is the provision of means for cutting off the feed of the deposited material at the exact place desired by the operator.

An additional object is to provide a spring acting cut-off member which member is biased to cut-off position, and which is released by the hand of the operator.

Still another object is to provide in a spreader having a handle for guiding the spreader, and in some cases pushing the spreader, an automatic cut-off lever, biased to cut-off position, where there is no time lag, and the closing of the depositing openings is accomplished automatically by the action of spring means.

Other objects will appear hereinafter throughout the specification.

In the drawings:

Figure 1 is a side elevational view with parts in section, showing a spreader and cut-off means therefor;

Figure 2 is a view taken on the line 2—2 of Figure 1;

Figure 3 is a view partly in full lines and partly in section of one side of the spreader; and Figure 4 is a section on the line 4—4 of Figure 1.

Heretofore, spreaders of the type hereinafter described were provided with a cut-off means that is manually operated for closing the openings through which the material is fed from the spreader receptacle. However, when coming to a place on the lawn or garden, such as when reaching the sidewalk, it is necessary to immediately cut off the flow of material. Additionally, there may be some places where it is desired not to deposit the material, because the plants at such place are positioned on the lawn or in the garden, would not be benefited and may even be killed by the deposit of the material thereon. Under these circumstances, it is essential that a garden tool be employed which is provided with spreading means so that as the tool is moved over the surface of the ground, the deposit of the fertilizer or seed may be discontinued instantly when a line is reached beyond which it is not desired to deposit the material. In using prior devices, it is necessary to stop the tool or spreader, then reach down and turn off the valve before proceeding further. This is a time-consuming operation, particularly when it is necessary to perform the same operation each time the tool reaches the line. It will be understood that such tools deposit the material along a path which is from two to three feet wide until the line is reached where the flow of material is cut off. This operation is repeated again and again along parallel offset paths until the entire lawn or garden has been treated. Each time, however, the flow of material must be cut off at a certain point, and heretofore this has only been accomplished by stopping the machine and operating a handle closely adjacent to the receptacle.

However, with the device of the present invention, as now to be described, it is possible to proceed in the depositing of the material up to the line, and without stopping the spreader, and by merely releasing the hand from the hand lever, the flow of material is immediately stopped; but the movement of the vehicle continues. This movement may be continued both during the cutting off of the flow of material and at the point where the deposit of the material begins. In other words, the stopping or the starting of the flow of material in no way depends upon whether the vehicle is moving or has stopped. The invention is particularly directed, however, to the stopping and starting of the flow of material while the vehicle or spreader is in motion.

In the drawings, A indicates the spreader as a whole. The spreader is provided with a receptacle 10 having an open top 12. The sides of the trough form a V and converge toward the trough bottom 14, and this is provided with a plurality of spaced apertures 16.

Extending laterally through the trough adjacent the trough bottom is a shaft 18. One or both ends of the shaft are flattened as shown at 20 for the mounting thereon of the wheels 22.

As seen in Figure 3, the wheel 22 has a flattened aperture 24 which latter is threaded on the flattened ends 20 of the shaft, and is held thereon by a washer 26 and a cotter pin 28. When the spreader is pushed over the ground, the rotation of one or both wheels 22 causes rotation of the shaft 18.

Fixedly mounted by welding, or by rivets, not shown, are the blades 30. These blades may be formed particularly as shown in Figures 1 and 3 from two pieces of sheet metal, the central portions of which are concave so as to fit about the shaft 18 to which they are welded or riveted. Each of the pieces of metal has a pair of radially projecting portions provided with spaced notches as shown in Figure 3. As the shaft 18 is rotated by the wheel or wheels 22, this combined agitator and spreader which includes blades 30 is rotated to break up the material, mix it and feed it toward the openings 16.

Located opposite the lower inclined sides of the receptacle and on the outside surfaces thereof are guides 32, usually four in number. Each of these guides has a lower portion 34 which is U-shaped in cross section. These guides retain and position the sliding shut-off member 36 whose lower central portion of which is provided with a series of apertures 38. These apertures correspond in number and spacing to apertures 16.

A combined supporting foot and lower handle section is indicated by the numeral 40 which is attached to receptacle 10 by bolts 42.

The upper handle section 44 is provided with bolts 46 for detachably connecting the sections 40 and 44 to each other.

The upper handle section 44 has a curved end 48 on which is mounted a hand grip 50.

Mounted on opposite sides of the curved end 48 are a pair of plates 52 and 54, these being attached to the curved end by a plurality of rivets 56.

Referring again to the sliding shut-off member 36, as shown in Figure 2, this member is provided with a slot 58 through which projects the tongue 60 of one end of the bell crank lever 62 which is provided with a pivot 64 that extends through the side of the receptacle 10. The other end of the bell crank lever is provided with a pivot pin 68. This pivot pin extends through an ear 68 of a coupling member 70 which latter is generally channel-shaped in cross section.

Extending into the channel of the coupling member and anchored to the lower end thereof by the cotter pin 72 is a lower rod 74. The upper end of this rod extends into a sleeve 76 and is anchored thereto by a rivet 78. The upper rod 80 has its lower end 82 extending into the sleeve 76 and may be adjustably connected thereto by means of a series of apertures 84, and the aperture 86 in the sleeve. When aperture 86 is in alignment with any one of the apertures 84, the parts may be retained in fixed position by means of a cotter pin 88.

A pivot 90 swingably supports the shut-off handle lever 92 on the plates 52, and the handle is connected to the top end of the upper rod by a pivot 94.

Biasing springs 96 are coiled about pivot 90. Parallel upper ends 98 of the springs bear against turned-in portions 100 of plates 52 and 54, and the opposite ends 102 of these springs bear against pivot 94 which latter connects upper rod 80 to handle 92.

The handle has an upper end 104 which is adapted to be brought into contact with plate 106. This plate has a wing nut and bolt connection 108 with slots 110 which extend through the plates 52 and 54.

Operation

Assuming that the spreader receptacle is filled with seeds or fertilizer or a combination of these, or with any material which it is desired to spread on the surface of a lawn or a garden, the spreader is manipulated by grasping the hand grip 50 and is pushed over the surface of the lawn. The springs 96 ordinarily hold the handle in the position shown in Figure 1 wherein the receptacle openings 16 are out of alignment with the apertures 38 of the sliding shut-off member, this position being illustrated in Figures 1 and 3. When it is desired to cause the deposition of the material on a surface, the handle 92 is grasped and pulled toward the hand grip 50. This action causes openings 16 and 38 to align with each other, and the fertilizer and/or seeds are fed through the aligned openings by the rotating blades 30 as they are driven by the wheel 22. When a line is reached beyond which it is not desired to deposit the material, the shut-off handle lever 92 is released, whereupon the springs 96 cause the rods 74 and 80 to move downwardly, forcing bell crank lever 62 in a clockwise direction as viewed in Figure 2 whereby the sliding shut-off member is operated within guide 32 to a position where the openings 16 and 38 are again dis-aligned.

It will be understood that the shut-off handle lever 92 may be rotated about pivot 90 only a short distance so that due to the partial dis-alignment of the openings 18 and 38, only a small amount of material passes through said openings. In this position, as well as in any position to which the shut-off handle lever 92 has been moved, said handle is immediately moved downwardly whereby the shut-off member cuts off the flow of material from the hopper or receptacle 10.

The plate 106 forms a positive stop for shut-off handle lever 92 whereby the handle may be moved toward the hand grip 50 only a limited amount, and this amount of movement may be adjusted as has been explained above.

The above description and drawings disclose a single embodiment of the invention, as specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. In a hand operated spreader for lawns and gardens, said spreader having wheels, a receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, a handle section connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means pivotally connecting said handle lever to said shut-off member and to said handle section, biasing means for biasing said shut-off member to a position where the spaced apertures thereof are disaligned with the spaced apertures of said receptacle, said means connecting said handle lever to said shut-off member comprising a plurality of rods, means adjustably connecting said rods to each other, means pivotally connecting one of said rods to said shut-off handle lever, and means connecting the other of said rods to said shut-off member, said last two named means permitting said rods and handle lever to move generally in a direction longitudinally of said handle section.

2. In a hand operated spreader for lawns and gardens, said spreader having wheels, a trough-shaped receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, a handle section connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means pivotally connecting said handle lever to said shut-off member and to said handle section, biasing means for biasing said shut-off member to a position where the spaced apertures thereof are disaligned with the spaced apertures of said receptacle, said means connecting said handle lever to said shut-off member comprising a plurality of rods, means adjustably connecting said rods to each other, means pivotally connecting one of said rods to said shut-off handle lever, and means connecting the other of said rods to said shut-off member, said last two named means permitting said rods and handle lever to move generally in a direction longitudinally of said handle section.

3. In a hand operated spreader for lawns and gardens, said spreader having wheels, a receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, a handle section connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means pivotally mounting said shut-off handle lever to said handle means, said means connecting said handle lever to said shut-off member comprising a plurality of rods, means adjustably connecting said rods to each other, means pivotally connecting one of said rods to said shut-off handle lever, and means connecting the other of said rods to said shut-off member, said last two named means permitting said rods and handle lever to move generally in a direction longitudinally of said handle section.

4. In a hand operated spreader for lawns and gardens, said spreader having wheels, a trough-shaped receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, a handle section connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means pivotally connecting said handle lever to said shut-off member and to said handle section, biasing means for biasing said shut-off member to a position where the spaced apertures thereof are disaligned with the spaced apertures of said receptacle, means pivotally mounting said shut-off handle lever to said handle means, said means connecting said handle lever to said shut-off member comprising a plurality of rods, means adjustably connecting said rods to each other, means pivotally connecting one of said rods to said shut-off handle lever, and means connecting the other of said rods to said shut-off member, said last two named means permitting said rods and handle lever to move generally in a direction longitudinally of said handle section.

5. In a hand operated spreader for lawns and gardens, said spreader having wheels, a receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, a handle section connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means pivotally connecting said handle lever to said shut-off member and to said handle section, biasing means for biasing said shut-off member to a position where the spaced apertures thereof are disaligned with the spaced apertures of said receptacle, means pivotally mounting said shut-off handle lever to said handle means, said means connecting said handle lever to said shut-off member comprising a plurality of rods, means adjustably connecting said rods to each other, means pivotally connecting one of said rods to said shut-off handle lever, and means connecting the other of said rods to said shut-off member, said last-named means including a bell crank lever having one of its ends connected to said last-named rod and its other end connected to said shut-off member, said last two named means permitting said rods and handle lever to move generally in a direction longitudinally of said handle section.

6. In a hand operated spreader for lawns and gardens, said spreader having wheels, a trough-shaped receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, a handle section connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means pivotally connecting said handle lever to said shut-off member and to said handle section, biasing means for biasing said shut-off member to a position where the spaced apertures thereof are disaligned with the spaced apertures of said receptacle, means pivotally mounting said shut-off handle lever to said handle means, said means connecting said handle lever to said shut-off member comprising a plurality of rods, means adjustably connecting said rods to each other, means pivotally connecting one of said rods to said shut-off handle lever, and means connecting the other of said rods to said shut-off member, said last-named means including a bell crank lever having one of its ends connected to said last-named rod and its other end connected to said shut-off member, said last two named means permitting said rods and handle lever to move generally in a direction longitudinally of said handle section.

7. In a hand operated spreader for lawns and gardens, said spreader having wheels, a trough-shaped receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, a handle section connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means pivotally connecting said handle lever to said shut-off member and to said handle section, biasing means for biasing said shut-off member to a position where the spaced apertures thereof are disaligned with the spaced apertures of said receptacle, said means connecting said handle lever to said shut-off member comprising a plurality of rods, means adjustably connecting said rods to each other, means pivotally connecting one of said rods to said shut-off handle lever, means connecting the other of said rods to said shut-off member, and means pivotally mounting said shut-off handle lever to said handle means, said last two named means permitting said rods and handle lever to move generally in a direction longitudinally of said handle section.

8. In a hand operated spreader for lawns and gardens, said spreader having wheels, a receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, a handle section connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means pivotally connecting said handle lever to said shut-off member and to said handle section, biasing means for biasing said shut-off member to a position where the spaced apertures thereof are disaligned with the spaced apertures of said receptacle, means pivotally mounting said shut-off handle lever to said handle means, said means connecting said handle lever to said shut-off member comprising a plurality of rods, means adjustably connecting said rods to each other, means pivotally connecting one of said rods to said shut-off handle lever, means connecting the other of said rods to said shut-off member, and means pivotally mounting said shut-off handle lever to said handle means, said last two named means permitting said rods and handle lever to move generally in a direction longitudinally of said handle section.

9. In a hand operated spreader for lawns and gardens, said spreader having wheels, a trough-shaped receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, handle means connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means connecting said handle to said shut-off member, biasing means for biasing said shut-off member to a position where the spaced apertures thereof are disaligned with the spaced apertures of said receptacle, said means connecting said handle to said shut-off member comprising a plurality of rods, means adjustably connecting said rods to each other, means pivotally connecting one of said rods to said shut-off handle lever, means connecting the other of said rods to said shut-off member, means pivotally mounting said shut-off handle lever to said handle means, including plate means mounted on said handle means, and adjustable stop means mounted on said plate means for limiting the movement of said shut-off handle lever whereby to regulate the amount of alignment between said apertures in said receptacle and the apertures in said sliding shut-off member.

10. In a hand operated spreader for lawns and gardens, said spreader having wheels, a receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, handle means connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means connecting said handle to said shut-off member, biasing means for biasing said shut-off member to a position where the spaced apertures thereof are disaligned with the spaced apertures of said receptacle, means pivotally mounting said shut-off handle lever to said handle means, said means connecting said handle to said shut-off member comprising a plurality of rods, means adjustably connecting said rods to each other, means pivotally connecting one of said rods to said shut-off handle lever, means connecting the other of said rods to said shut-off member, means pivotally mounting said shut-off handle lever to said handle means, including plate means mounted on said handle means, and adjustable stop means mounted on said plate means for limiting the movement of said shut-off handle lever whereby to regulate the amount of alignment between said apertures in said receptacle and the apertures in said sliding shut-off member.

11. In a hand operated spreader for lawns and gardens, said spreader having wheels, a trough-shaped receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, handle means connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means connecting said handle to said shut-off member, biasing means for biasing said shut-off member to a position where the spaced apertures thereof are disaligned with the spaced apertures of said receptacle, said means connecting said handle to said shut-off member comprising a plurality of rods, means adjustably connecting said rods to each other, means pivotally connecting one of said rods to said shut-off handle lever, and means connecting the other of said rods to said shut-off member, said handle means having pivot means whereby to pivotally mount said shut-off handle lever thereon, said biasing means comprising a pair of springs mounted on said handle pivot means, said springs having ends bearing against said handle means and other ends bearing against said shut-off handle lever.

12. In a hand operated spreader for lawns and gardens, said spreader having wheels, a receptacle supported by said wheels, shaft means for said wheels extending into said receptacle adjacent the bottom thereof, a series of spaced apertures in the bottom of said receptacle, blade means mounted on said shaft means and driven thereby, means drivingly connecting at least one of said wheels to said shaft means, handle means connected to said spreader for propelling the same over a surface, a sliding shut-off member having a plurality of spaced apertures, means mounting said shut-off member on the said receptacle adjacent the exterior lower end thereof: the combination with said spreader of means for aligning and disaligning the apertures in said receptacle with those of the shut-off member comprising a shut-off handle lever, means connecting said handle to said shut-off member, biasing means for biasing said shut-off member to a position where the spaced apertures thereof are disaligned with the spaced apertures of said receptacle, means pivotally mounting said shut-off handle lever to said handle means, said means connecting said handle to said shut-off member comprising a plurality of rods, means adjustably connecting said rods to each other, means pivotally connecting one of said rods to said shut-off handle lever, and means connecting the other of said rods to said shut-off member, said handle means having pivot means whereby to pivotally mount said shut-off handle lever thereon, said biasing means comprising a pair of springs mounted on said handle pivot means, said springs having ends bearing against said handle means and other ends bearing against said shut-off handle lever.

References Cited in the file of this patent

UNITED STATES PATENTS

| Number | Name | Date |
|---|---|---|
| 2,513,810 | Masters | July 4, 1950 |
| 2,604,234 | Long | July 22, 1952 |
| 2,661,124 | Ajero | Dec. 1, 1953 |